(12) United States Patent
Karapicak et al.

(10) Patent No.: US 10,477,856 B2
(45) Date of Patent: Nov. 19, 2019

(54) MECHANISM CHASSIS FOR MECHANICAL WILD BIRD AND ANIMAL REPELLENT DEVICE

(71) Applicant: DEGER KOMPRESOR SANAYI ITHALAT IHRACAT TICARET LIMITED SIRKETI, Konya (TR)

(72) Inventors: Abdullah Cengiz Karapicak, Konya (TR); Ridvan Sayargil, Konya (TR)

(*) Notice: Subject to any disclaimer, the term of this patent is extended or adjusted under 35 U.S.C. 154(b) by 250 days.

(21) Appl. No.: 15/510,869

(22) PCT Filed: Sep. 14, 2015

(86) PCT No.: PCT/TR2015/050099
§ 371 (c)(1),
(2) Date: Mar. 13, 2017

(87) PCT Pub. No.: WO2016/039711
PCT Pub. Date: Mar. 17, 2016

(65) Prior Publication Data
US 2017/0258070 A1   Sep. 14, 2017

(30) Foreign Application Priority Data

Sep. 13, 2014  (TR) ............... a 2014 10787

(51) Int. Cl.
*A01M 29/00* (2011.01)
*A01M 29/20* (2011.01)
*F16M 13/02* (2006.01)

(52) U.S. Cl.
CPC .......... *A01M 29/20* (2013.01); *F16M 13/022* (2013.01)

(58) Field of Classification Search
CPC ....... A01M 29/20; A01M 29/16; A01M 29/00
See application file for complete search history.

(56) References Cited

U.S. PATENT DOCUMENTS 5,977,866 A * 11/1999 Joseph, Jr. ............ A01M 29/20
116/22 A

FOREIGN PATENT DOCUMENTS

| FR | 847 858 A | 10/1939 |
| FR | 1 077 577 A | 11/1954 |
| GB | 1 526 308 A | 9/1978 |

OTHER PUBLICATIONS

International Search Report for Application No. PCT/TR2015/050099 dated Jan. 14, 2016.

* cited by examiner

*Primary Examiner* — Kristen C Hayes
(74) *Attorney, Agent, or Firm* — Gokalp Bayramoglu

(57) ABSTRACT

A chassis for mechanisms of mechanical wild bird and animal repellent devices that is used to detract wild birds and animals from plantation areas, greenhouses and similar areas which they can harm or be harmed. The chassis is made from a composite plastic material. The chassis comprises a body, a cap, a safety slide, a chassis connection part and a raincoat. The chassis is produced in plastic injection machines.

6 Claims, 19 Drawing Sheets

Figure 1:
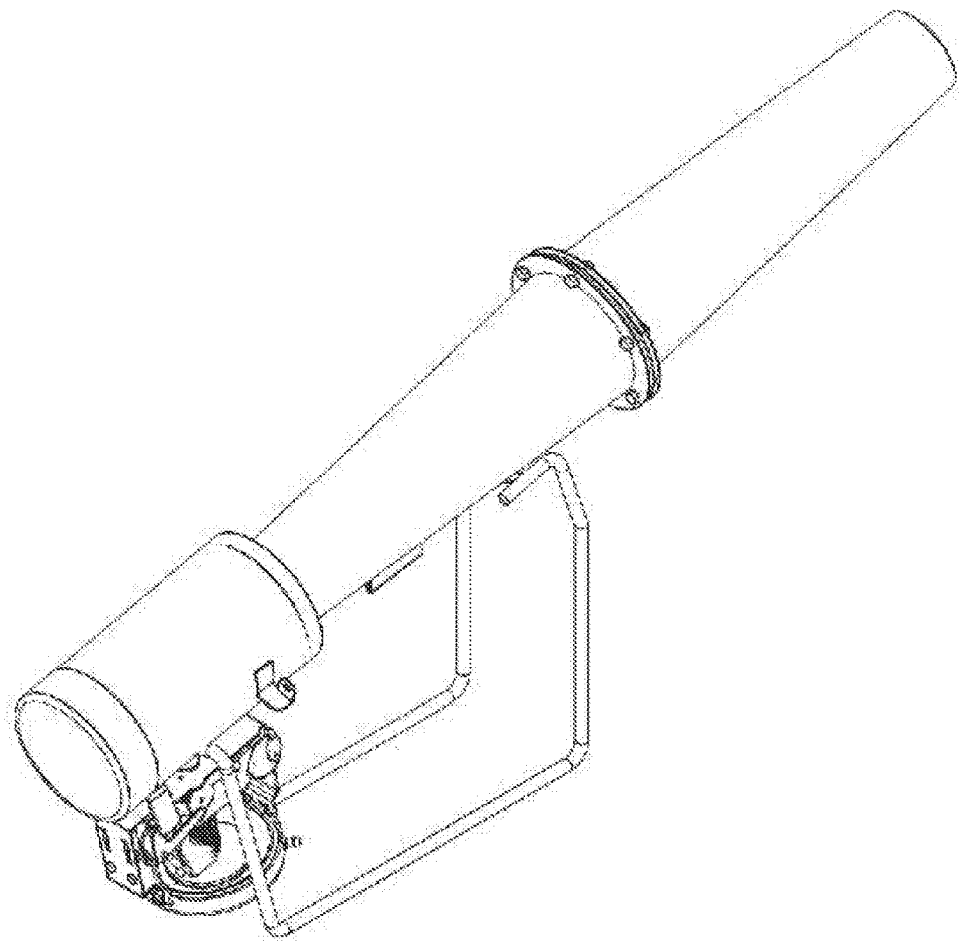

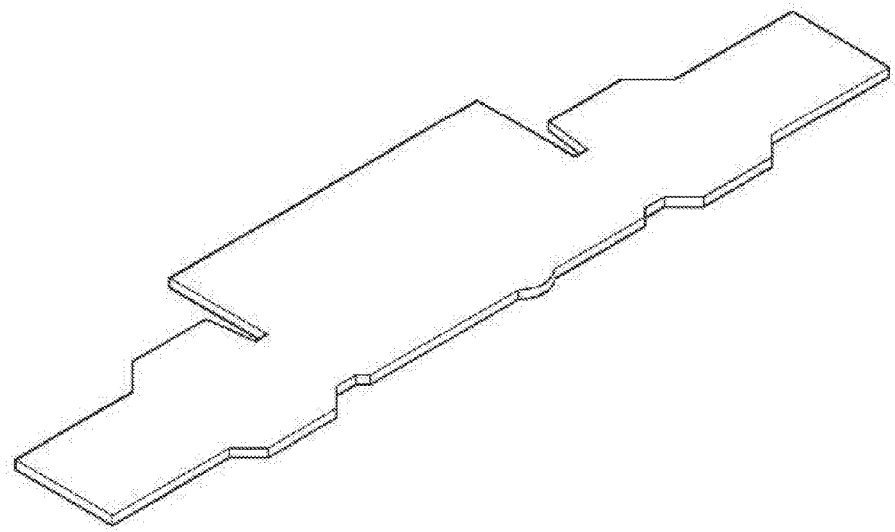
FIGURE 4
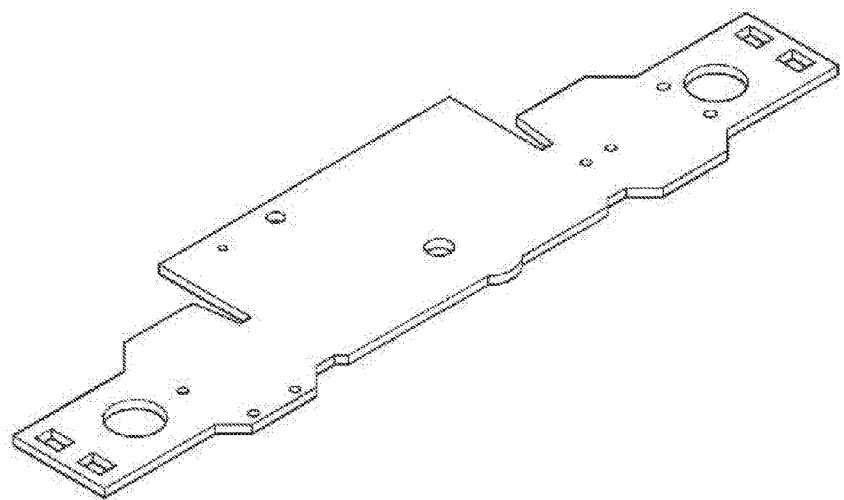
FIGURE 4-A

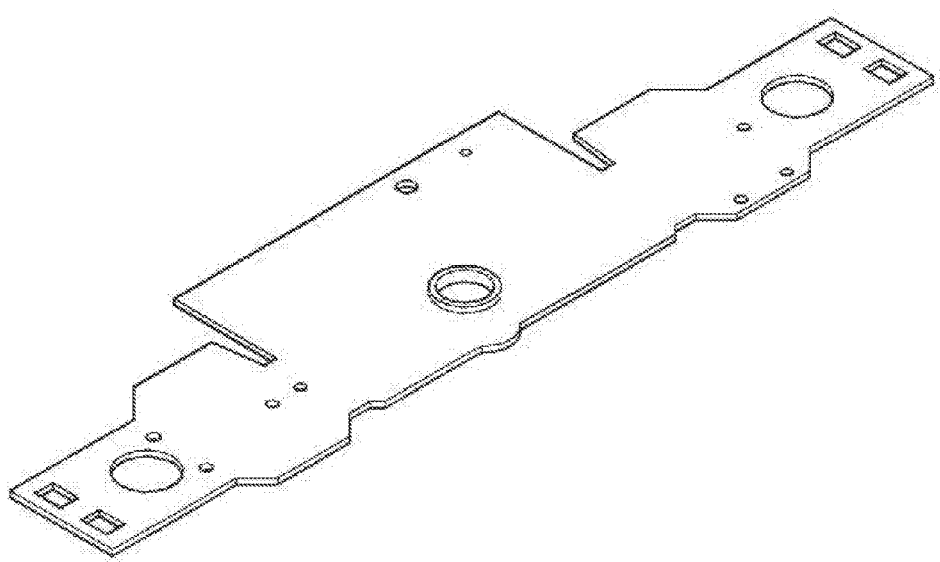
FIGURE 4-B
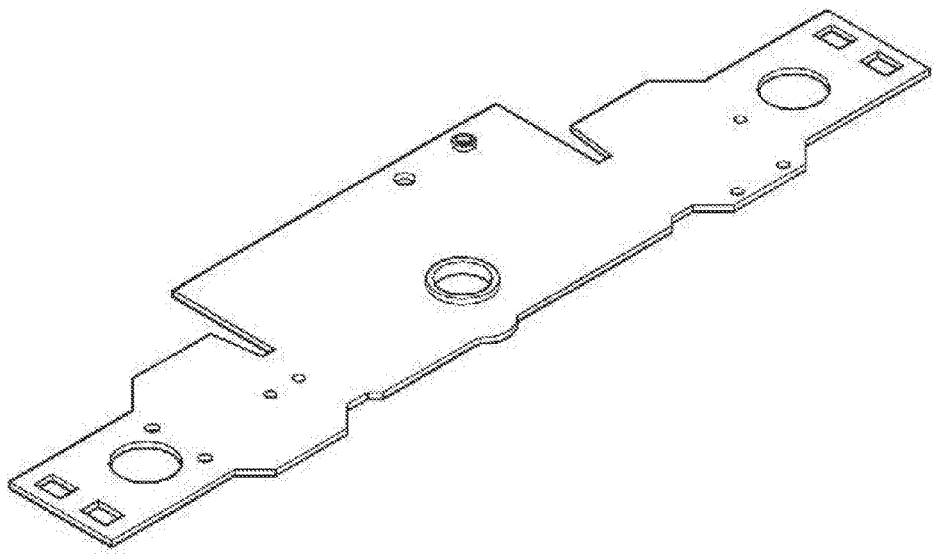
FIGURE 4-C

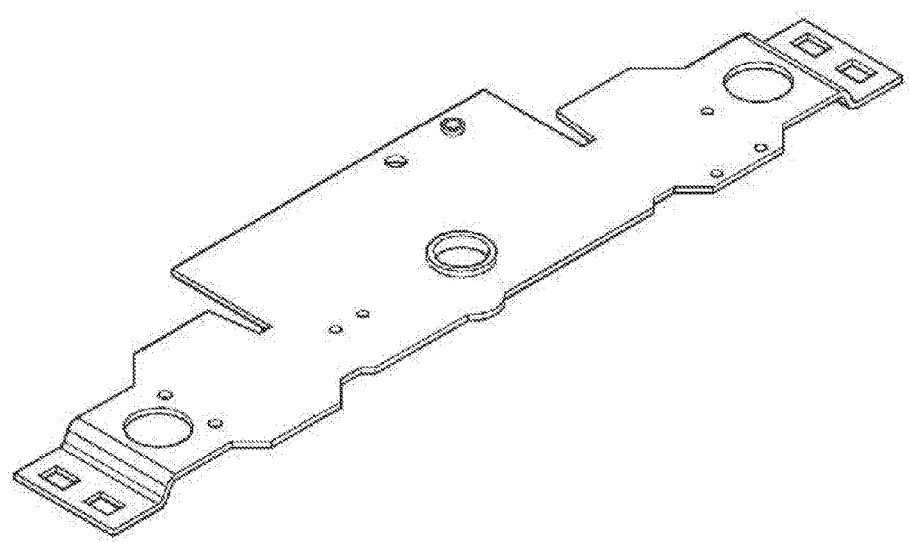
FIGURE 4-D
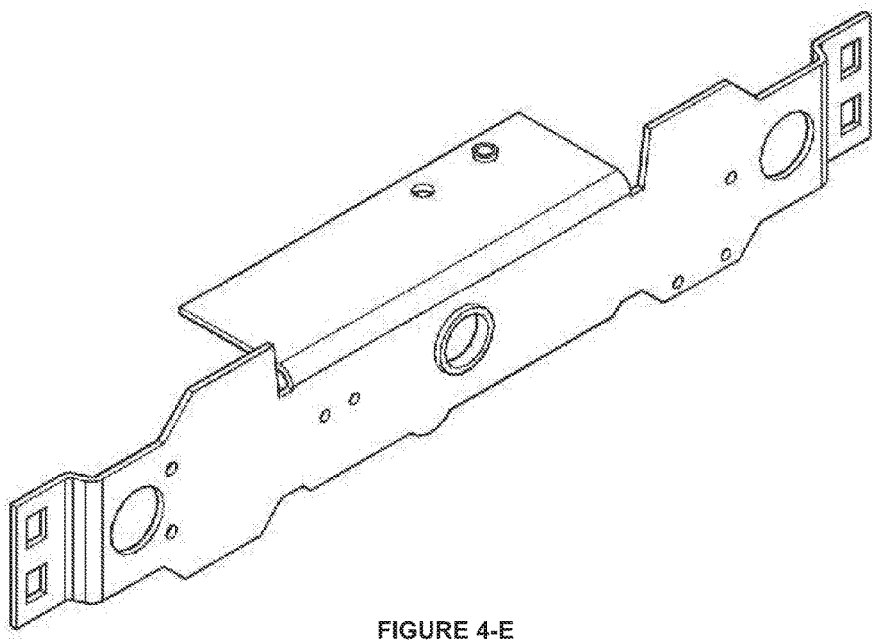
FIGURE 4-E

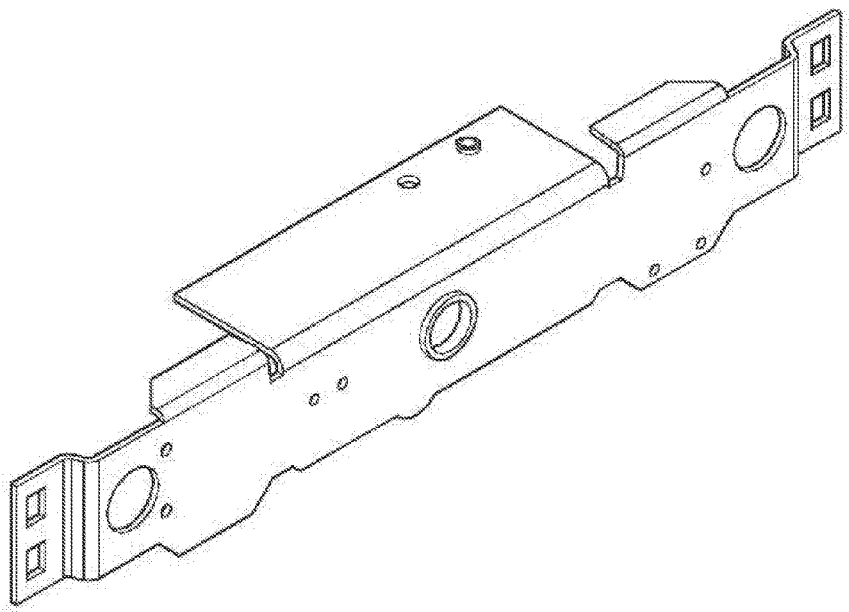
FIGURE 4-F
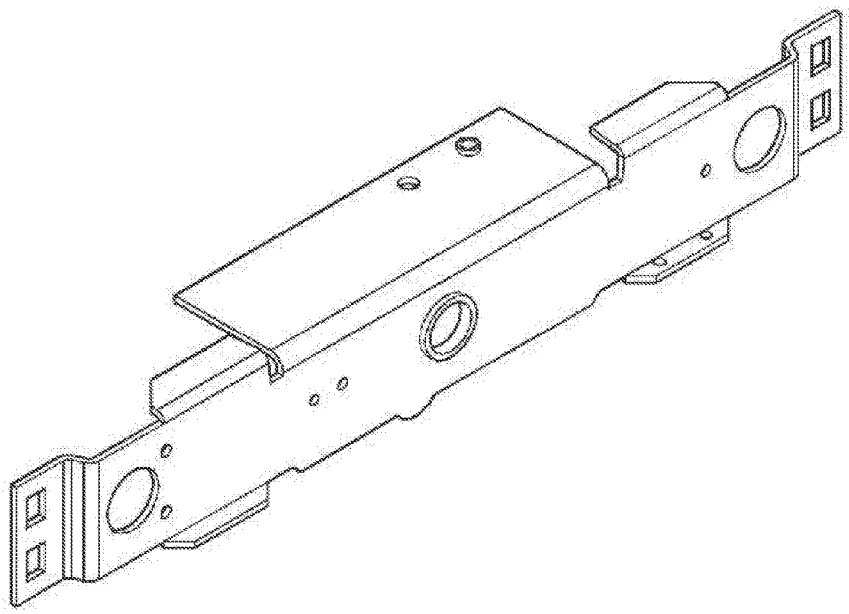
FIGURE 4-G

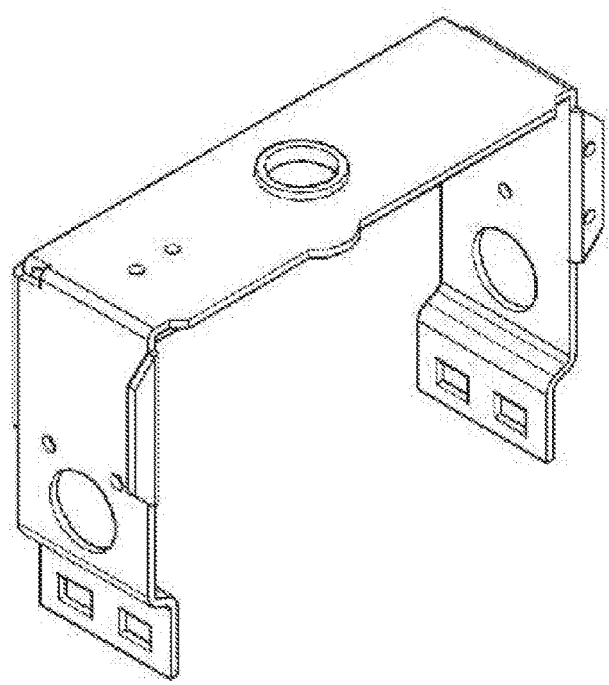
FIGURE 4-H
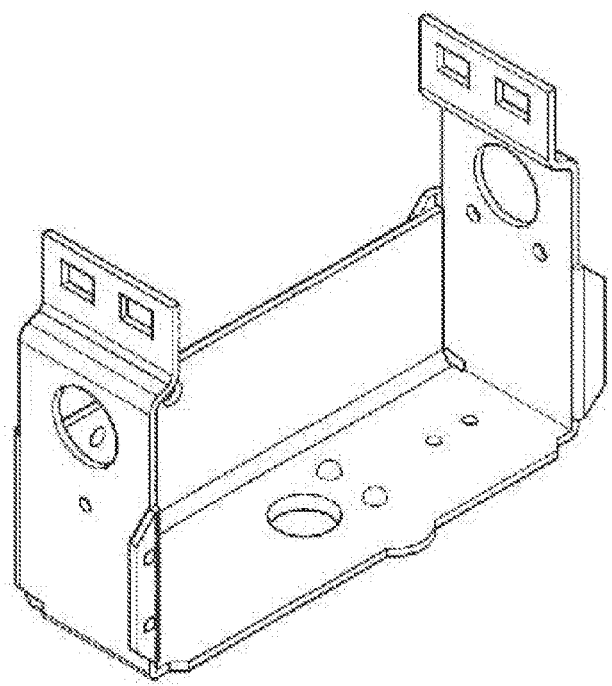
FIGURE 4-I

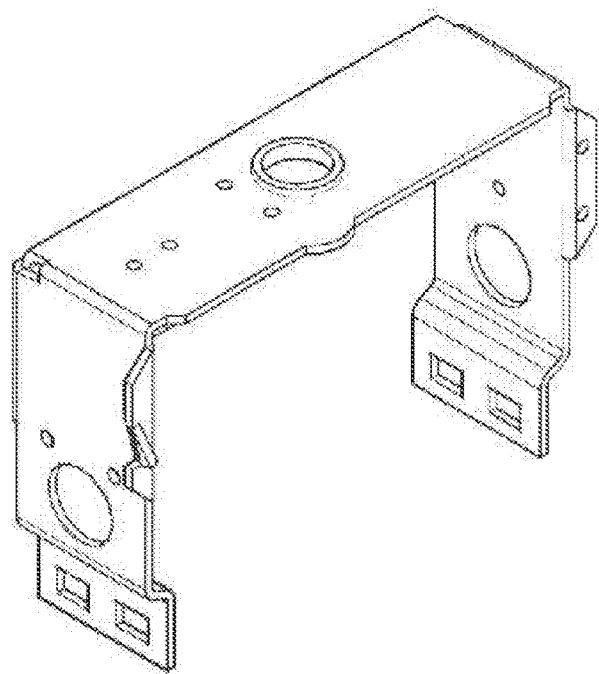
FIGURE 4-J
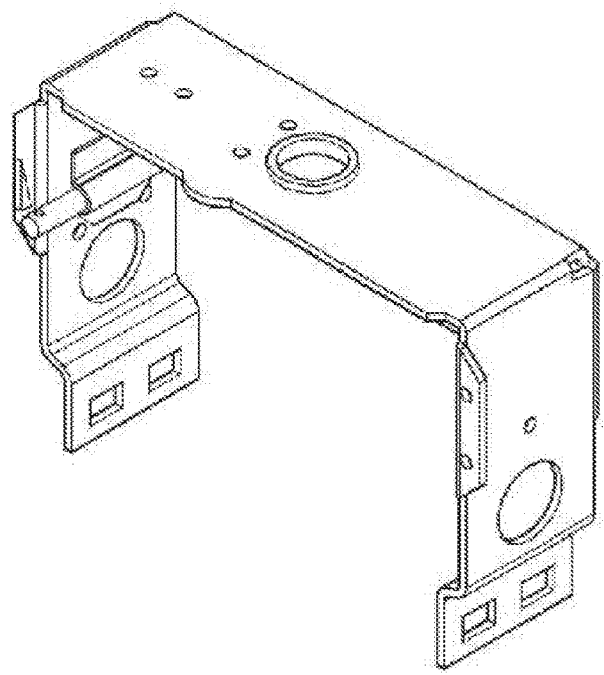
FIGURE 4-K

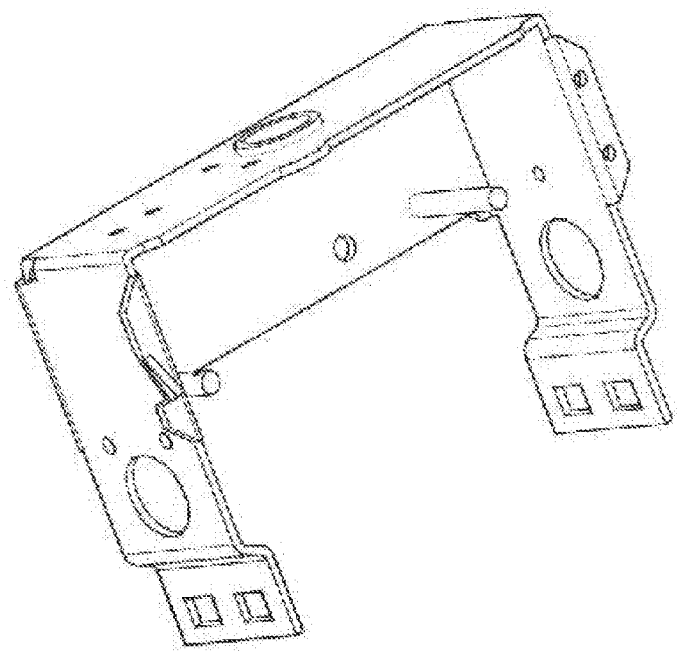
FIGURE 4-L
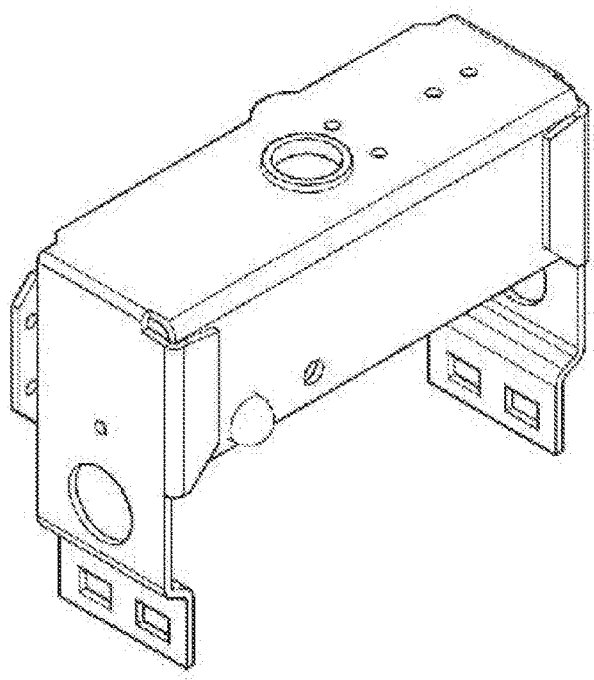
FIGURE 4-M

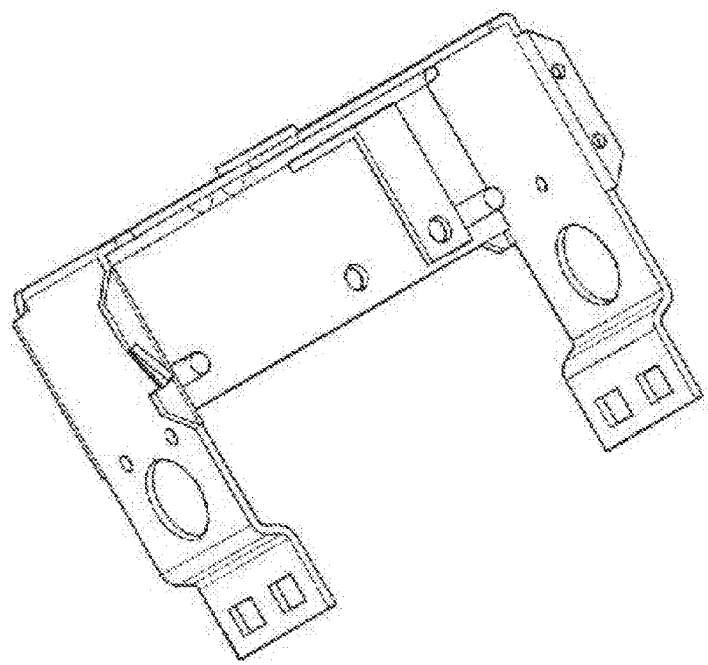
FIGURE 4-N
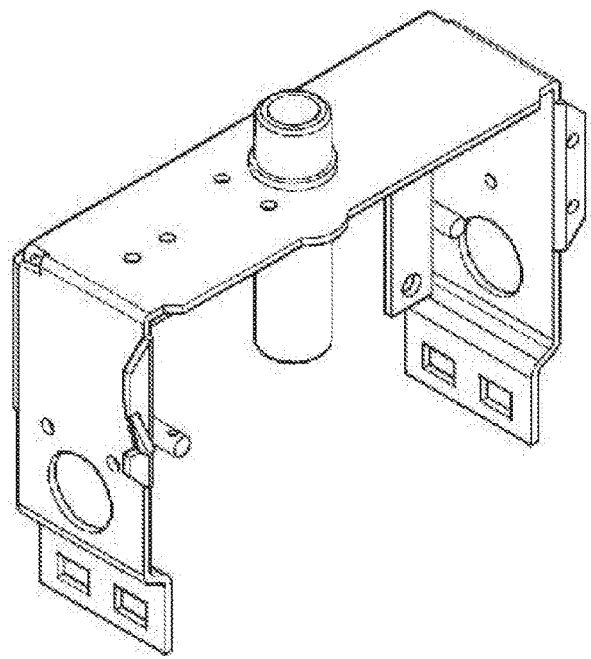
FIGURE 4-O

FIGURE 4-Ö

MECHANISM CHASSIS FOR MECHANICAL WILD BIRD AND ANIMAL REPELLENT DEVICE

RELATED APPLICATIONS

The present invention is a U.S. National Stage under 35 USC 371 patent application, claiming priority to Serial No. PCT/TR2015/050099, filed on 14 Sep. 2015; which claims priority from TR 2014/10787, filed on 13 Sep. 2014, the entirety of both of which are incorporated herein by reference.

TECHNICAL FIELD

Invention is about a chassis for mechanisms of mechanical wild bird and animal repellent devices that is used to detract wild birds and animals from plantation areas, greenhouses and similar areas which they can harm or be harmed.

BACKGROUND

There are different types of bird and wild animal repellent devices. One of the common models of those repellent devices is the device which detracts birds and wild animals with a high level noise by transferring a certain amount of liquid oil gas to blasting tank with a mechanism and firing that liquid oil gas again with that mechanism from plantation areas, fish producing farms, airports, chicken and breeding farms, storage, silos, bee hives and similar areas that can be harmed or harm. Those devices work with tube pressure and they do not need any other type of energy.

The chassis of above mention mechanical devices has a producing process with multiple stages and all of its pieces are open to external factors. Producing of the chassis is started with sizing the sheet plates in guillotines. Then the first shaping is done with trepanning mold in eccentric press. The central and the mounting holes on the parts are opened with the punching mold in eccentric press. The process continues with forming of the shrink fit place of bearing mounting holes and the shrink fit of gas cutting pin. Forming a twist is the next process for the distance of blower bowl holder places and endurance. Twisting of the centering place is done to increase the endurance and form the leg fastening part. Then the opposite twisting is done. Twisting of trigger rest and silicon hose hiding place is done. Twisting is done for the basic working modeling of blower bowl holder distance and the trigger base. Piezoelectric igniter tractive bearings are formed with inflating method. Trigger rest place is opened. A supportive piece is needed to fasten the trigger base pin to the chassis. That supportive piece is separately produced and fastened to the chassis to hold the trigger pin by centering. Gas cutting pin is mounted fit in its hole on the chassis with the help of hydraulic press. And it is welded to chassis to increase the endurance. The automatic piece is the piece which cuts the gas and squeezes the trigger by setting up the mechanism. That piece works in the bearings which are placed on the chassis. One of the bearings is formed by centering a supportive piece on the chassis. Centering the supportive pieces needs sensitive mounting because of the necessity of alignment. In those procedures, margin of error is very low. Incorrect mounting can cause the system completely fail. Bush piece is tightly mounted in its formerly prepared bearing on the chassis with the help of hydraulic press. The connection piece which enables mounting of the chassis to the repellent device is centered on the chassis. Connection piece is formed after a three staged process. After that process, shaping processes are done and the purification from oil process is started. Then it is dried by rinsing in clean water. It is roasted by being dyed with electro-static powder paint. The pieces which are taken from the oven are ready to assembly. The chassis which are produced with techniques in the prior art, pass through a multiple staged producing process. In every stage, the pieces must be carried between benches. There are losses because of cutting, puncturing of sheet plates and faulty of workmanship. Work accident risk is high in producing processes because working with dangerous benches such as press, guillotine, etc.

The mechanical parts of the bird repeller mounted on chassis of our days, are affected from rain, dust, mud and similar external factors. And its hose part is also destroyed by rodents when it is not in use. These situations cause working parts to work irregularly or be disabled in a short time period by being affected from external factors. Interventions can happen to these systems because of not having a security precaution. That situation can cause unwanted injuries and make the device become inoperative.

The chassis in our days hold the blower bowl on four tabs. During the operation, all the tension is localized on these tabs. That may cause deformation on the tabs. The product can become inoperative because of the change in work stroke caused by deformation.

The problems can be seen in mounting processes of the parts on chassis because of not having standardization in producing processes. The deformation of plate in processes like cutting, twisting, covering, pressing, welding, centering and not being homogeneous of the raw material properties are the reasons to use extra labor to matchup bearings, which is used to combine the chassis with parts and sections, which is used for centering. That situation makes difficult to standardize the product and raise the production costs of the producer.

BRIEF DESCRIPTION OF THE INVENTION

Invention is about a chassis for mechanisms of mechanical wild bird and animal repellent devices that is used to detract wild birds and animals from plantation areas, greenhouses and similar areas which they can harm or be harmed. The subject matter chassis is produced from plastic. It is a mechanism chassis for mechanical wild bird and animal repellent device, comprising; body, cap, safety slide, chassis connection part and raincoat. It is produced in plastic injection machines with the help of molds by sensitive production.

LIST OF FIGURES

FIG. 1. Mounted View of the Bird Repeller in Prior Art

Figure 2:
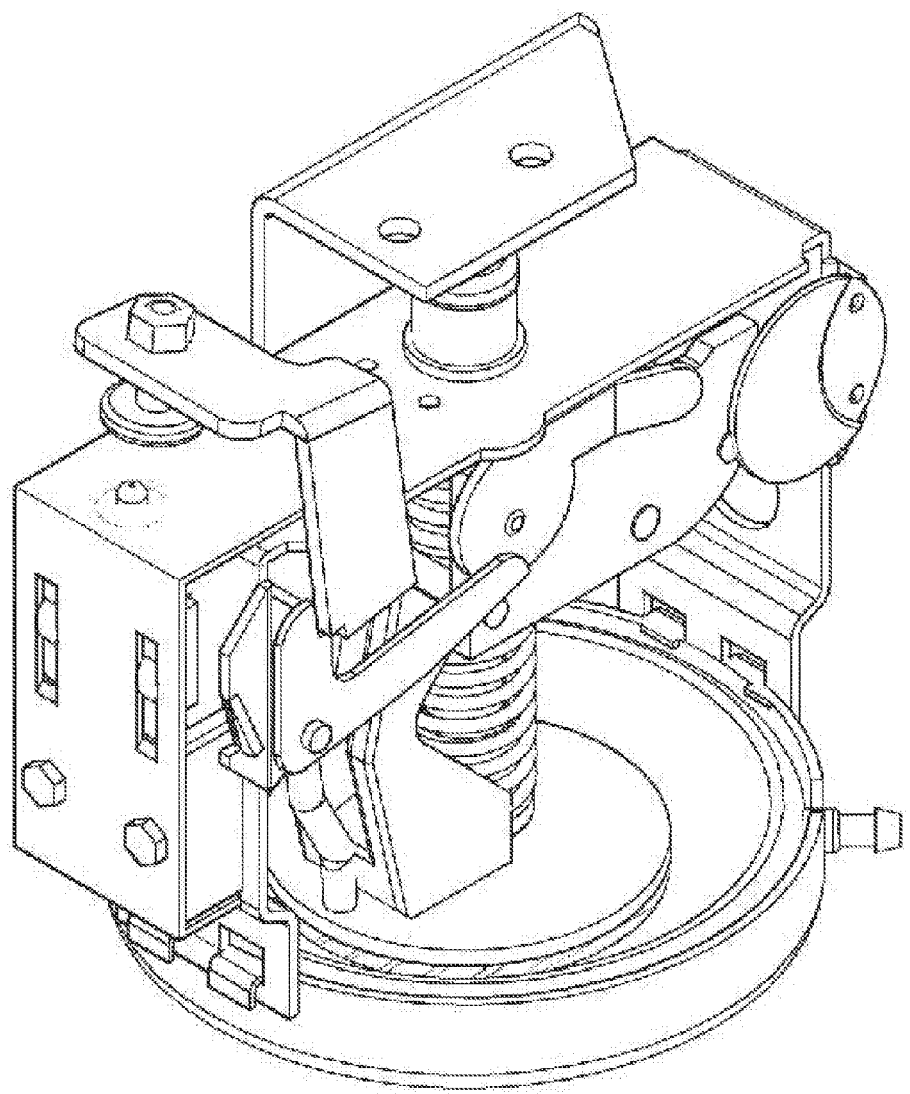

FIG. 2. Mounted View of the Mechanism on Chassis Produced with Prior Art

Figure 3:
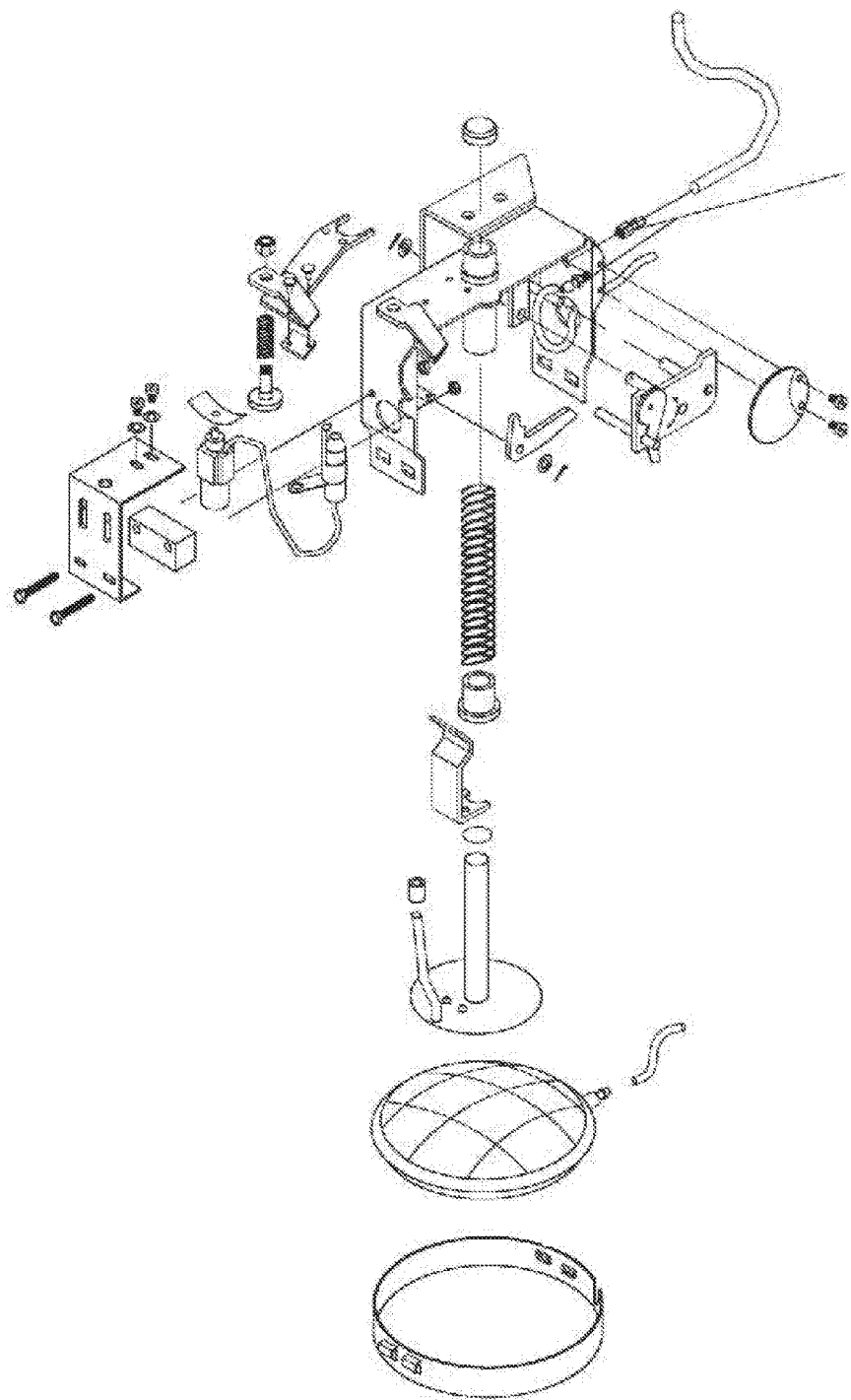

FIG. 3. Exploded View of the Mechanism on Chassis Produced with Prior Art

FIG. 4. View of the Chassis Produced with Prior Art, After Sizing Process

FIG. 4a. View of the Chassis Produced with Prior Art, After Punching Process

Figure 5:
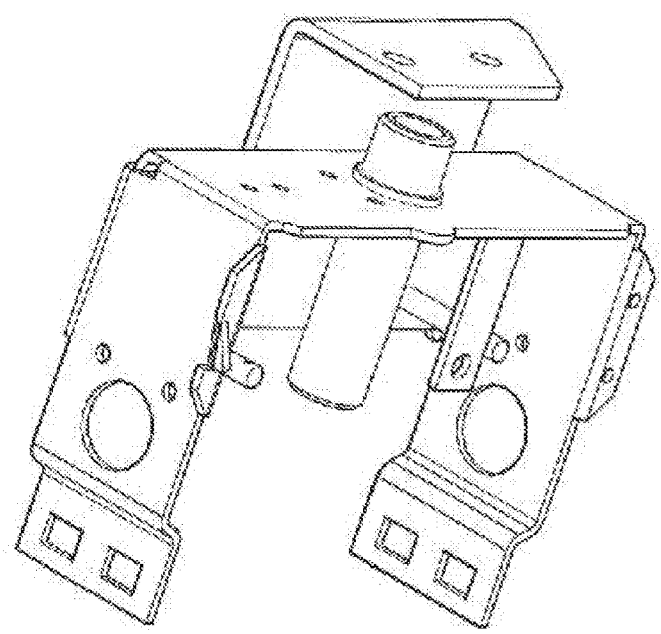
Figure 5:
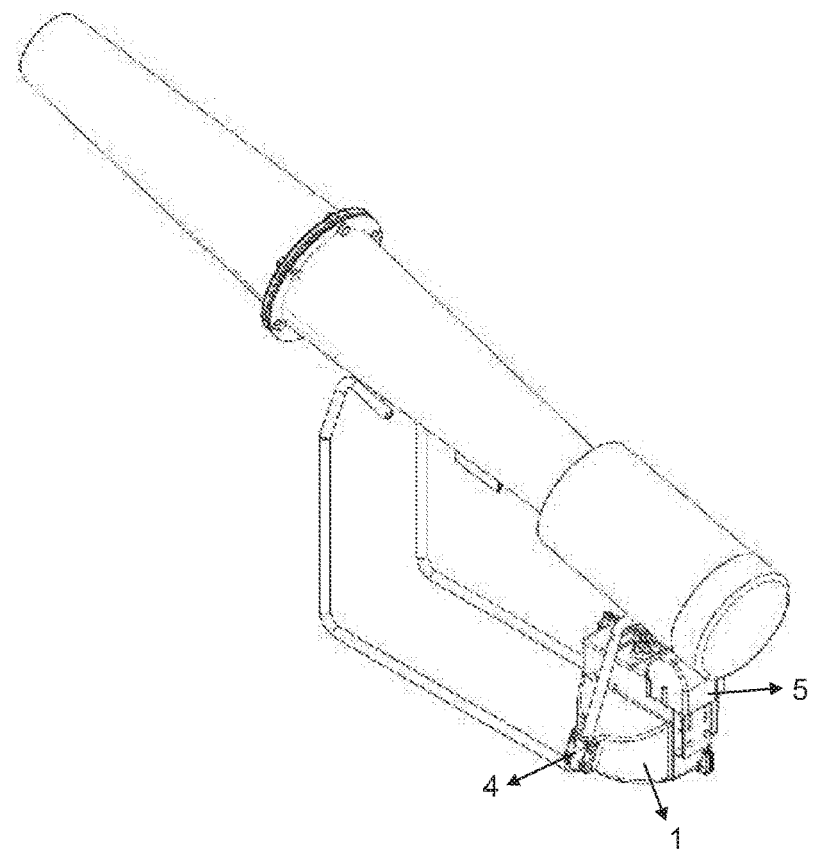
Figure 6:
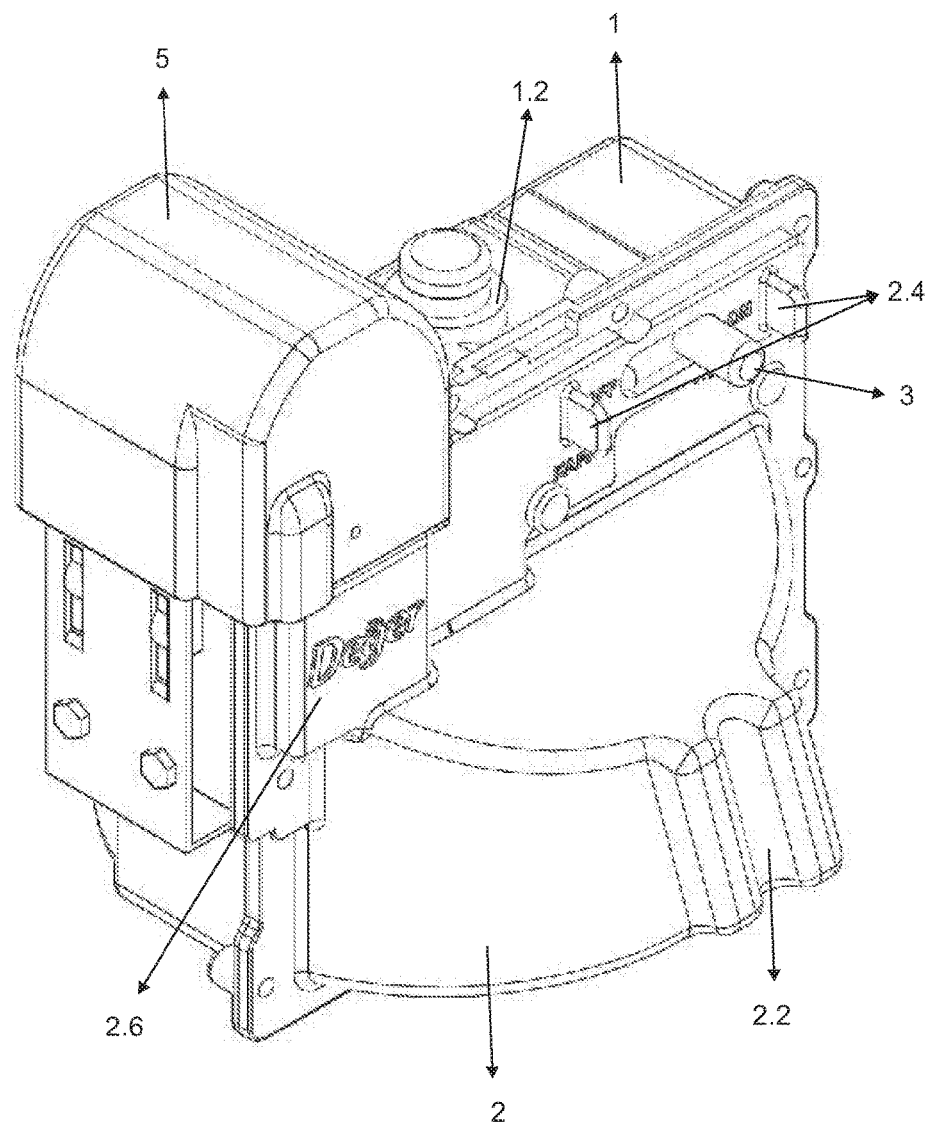
Figure 7:
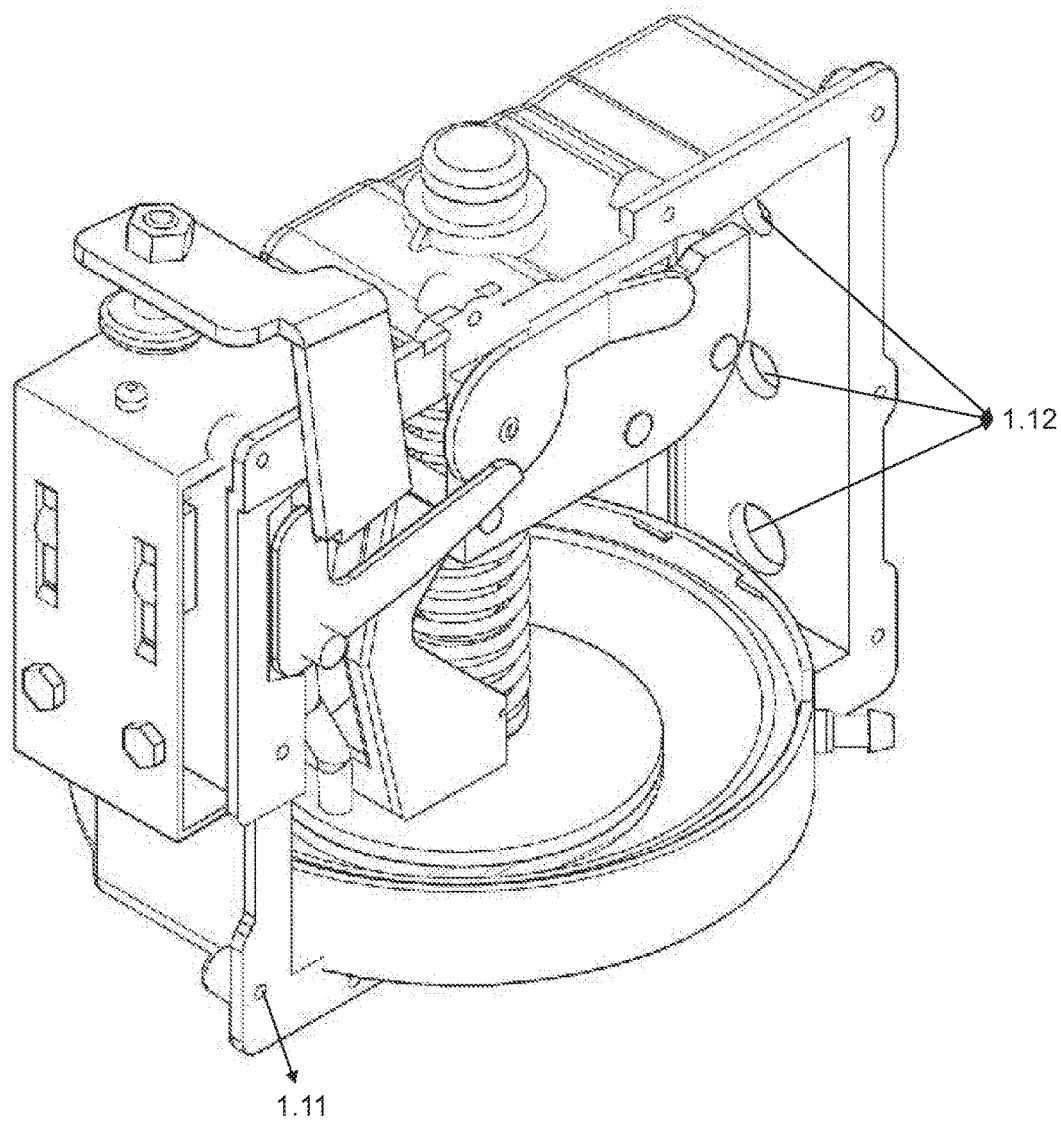
Figure 8:
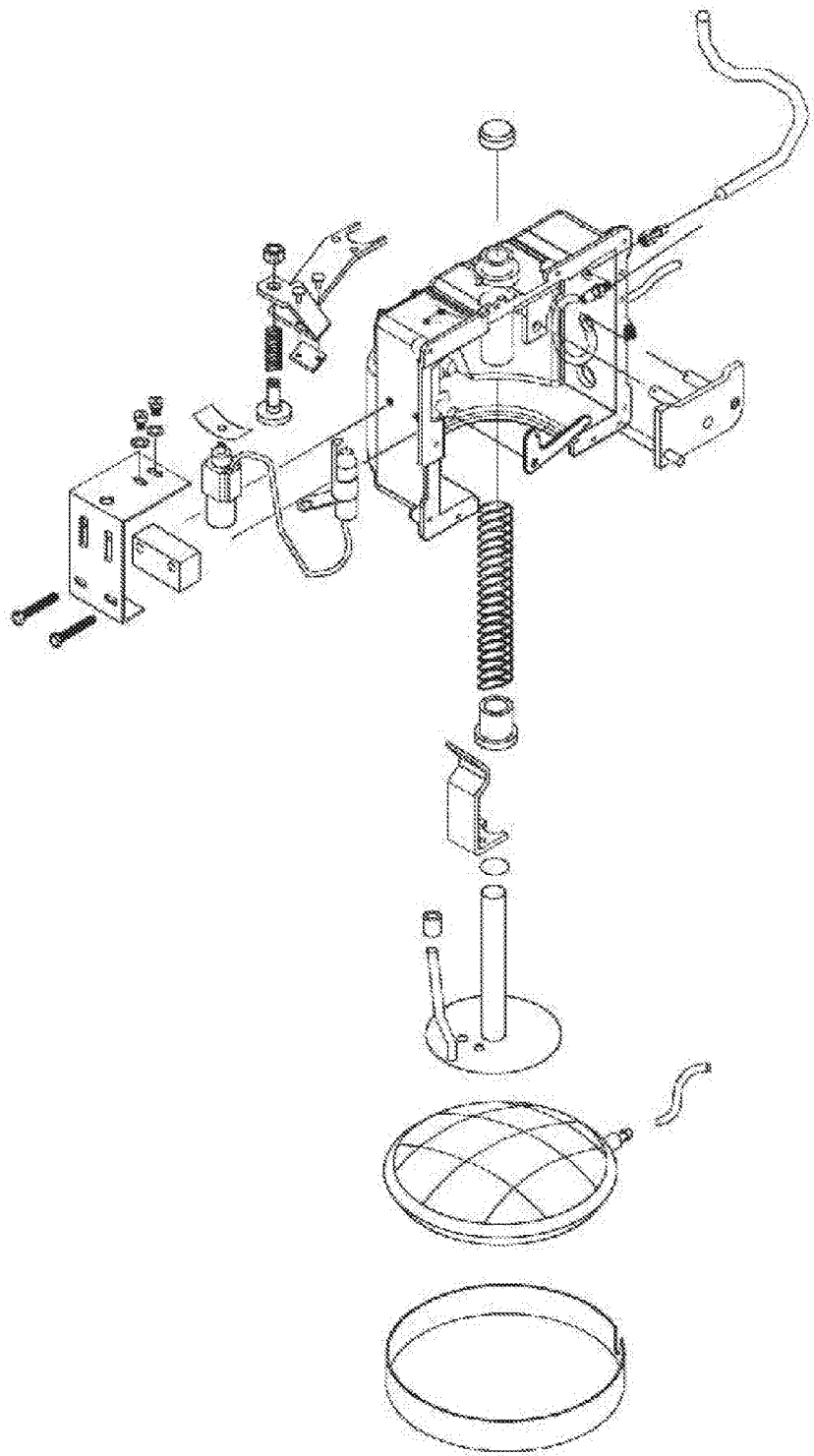
Figure 9:
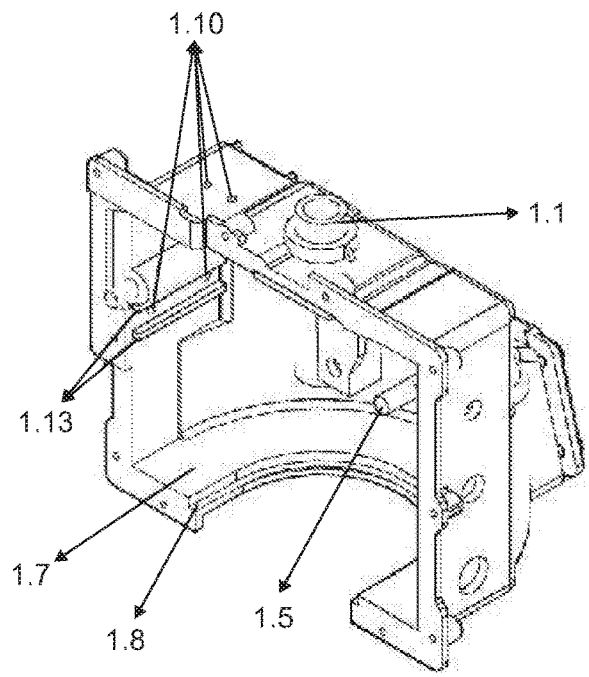
Figure 10:
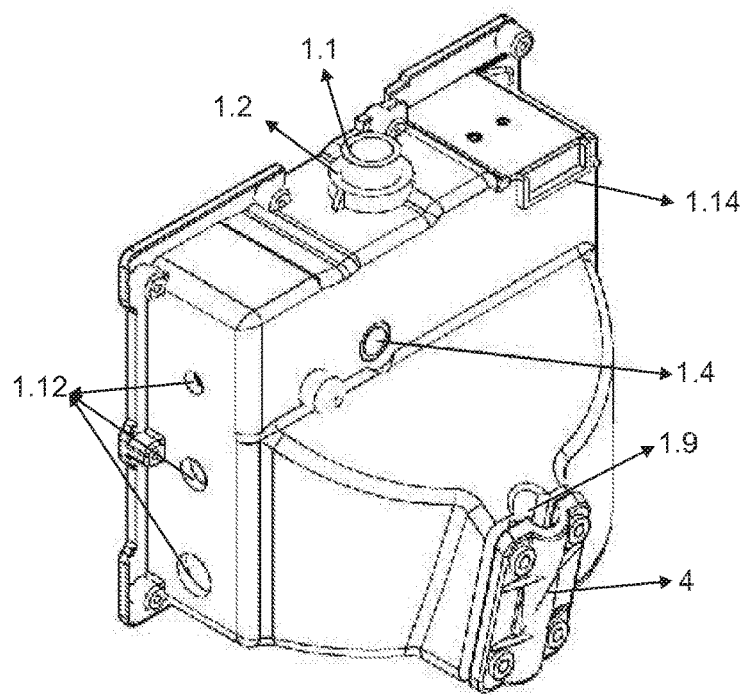
Figure 11:
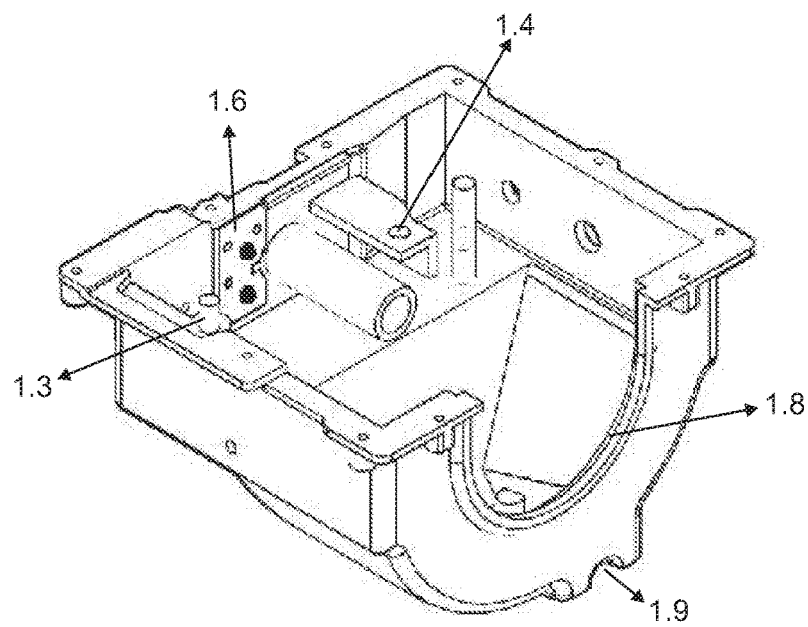
Figure 12:
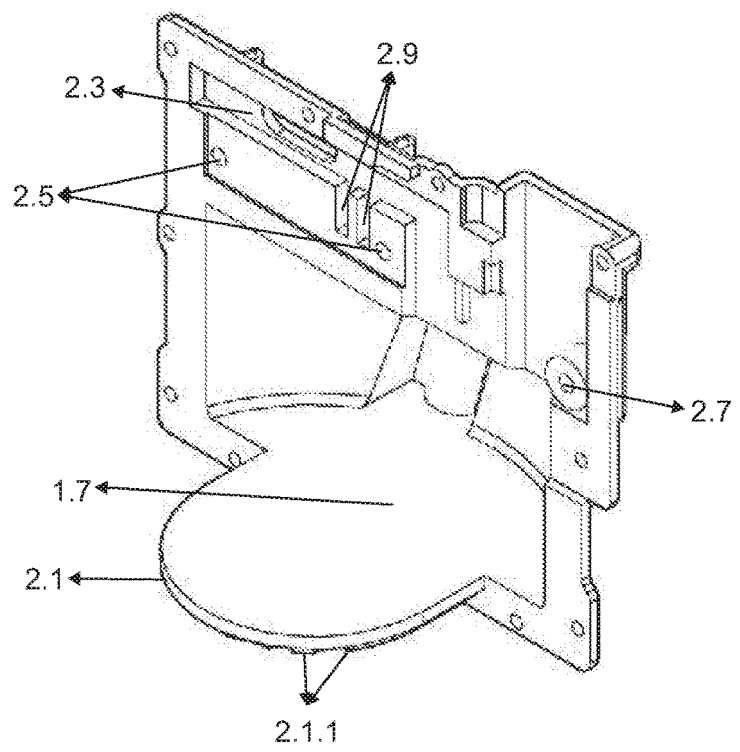
Figure 13:
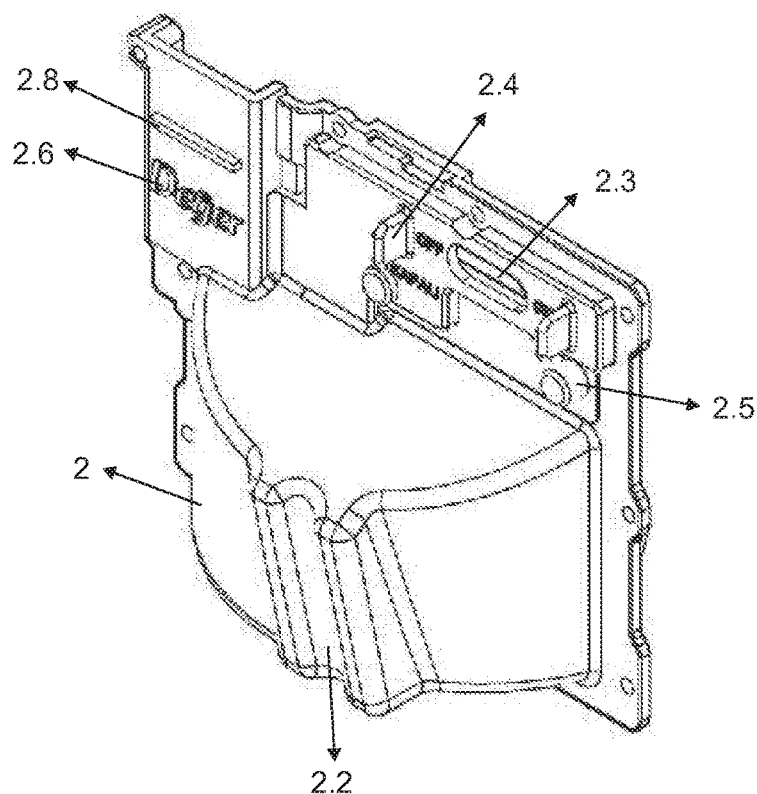
Figure 14:
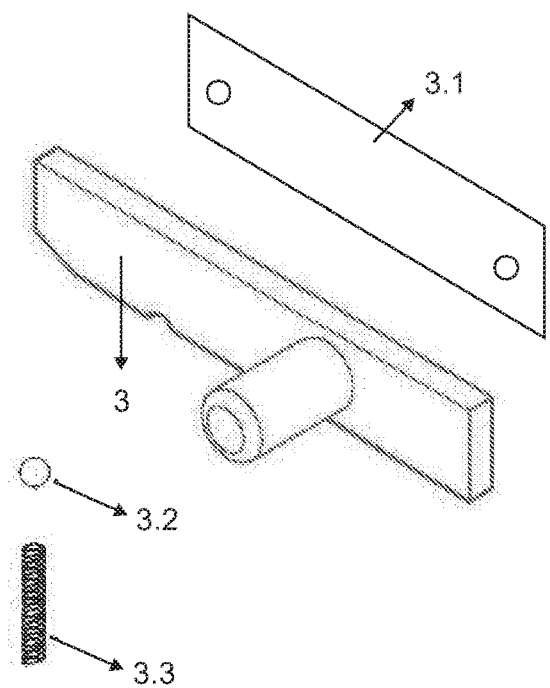
Figure 15:
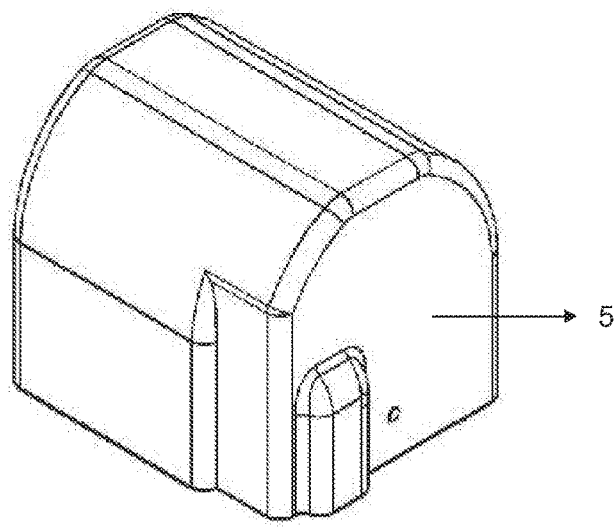
Figure 16:
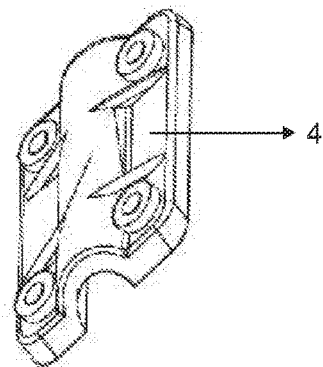
Figure 17:
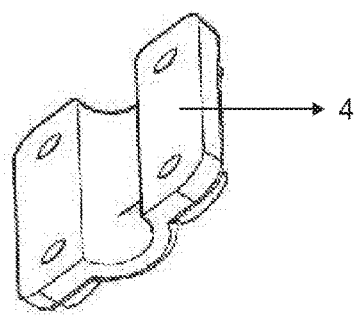

FIG. 4b. View of the Chassis Produced with Prior Art, After Bush Hole Preparation Process FIG. 4c. View of the Chassis Produced with Prior Art, After Gas Cutting Pin Hole Preparation Process FIG. 4d. View of the Chassis Produced with Prior Art, After Twisting Process for Blower Bowl Holder and Endurance FIG. 4e. View of the Chassis Produced with Prior Art, After Twisting Process for Centering Place of Leg Connection Part and Endurance FIG. 4f. View of the Chassis Produced with Prior Art, After Counter Twisting Process for Centering Place of Leg Connection Part and Endurance FIG. 4g. View of the Chassis Produced with Prior Art, After Twisting Process for Trigger Rest Place and Silicon Hose Hiding Place FIG. 4h. View of the Chassis Produced with Prior Art, After Shaped for Basic Working to Provide Centering Place for Leg Connection Part, Blower Bowl Holder Distance and Trigger Base FIG. 4i. View of the Chassis Produced with Prior Art, After Inflating Process of Piezoelectric Igniter Tractive Bearings FIG. 4j. View of the Chassis Produced with Prior Art, After Trigger Rest Place Opening Process FIG. 4k. View of the Chassis Produced with Prior Art, After Centering Process of Trigger Base FIG. 4l. View of the Chassis Produced with Prior Art, After Shrink Fit Mounting Process of Gas Cutting Pin FIG. 4m. View of the Chassis Produced with Prior Art, After Welding Process of Gas Cutting Pin FIG. 4n. View of the Chassis Produced with Prior Art, After Centering Process of Automatic Pin Bearing FIG. 4o. View of the Chassis Produced with Prior Art, After Shrink Fit Mounting of the Bush in Hydraulic Press FIG. 4ö. View of the Chassis Produced with Prior Art, After Centering Process of Supportive Part FIG. 5. Mounted View of the Chassis which is the Subject of our Application, on Bird Repeller Device FIG. 6. Mounted View of the Chassis which is the Subject of our Application FIG. 7. Mounted View of the Chassis which is the Subject of our Application while the Cap is Open FIG. 8. Exploded View of the Chassis which is the Subject of our Application while the Cap is Open FIG. 9. Front View of the Body of the Chassis which is the Subject of our Application FIG. 10. Rear View of the Body of the Chassis which is the Subject of our Application FIG. 11. View from Below of the Body of the Chassis which is the Subject of our Application FIG. 12. Front View of the Cap of the Chassis which is the Subject of our Application FIG. 13. Rear View of the Cap of the Chassis which is the Subject of our Application FIG. 14. General View of the Chassis which is the Subject of our Application from Safety Slide FIG. 15. General View of the Chassis which is the Subject of our Application from Raincoat FIG. 16. Front View of the Chassis Connection Part of the Chassis which is the Subject of our Application FIG. 17. Rear View of the Chassis Connection Part of the Chassis which is the Subject of our Application The equivalents of the indicated numbers in figures are given below.

1. Body
1.1. Bush
1.2. Bush Bearing
1.3. Trigger Pin
1.4. Automatic Bearing
1.5. Gas Cutting Pin
1.6. Hammer Lever Bearings
1.7. Blower Bowl Bearing
1.8. Door Drawer Bearing
1.9. Body Connection Part
1.10. Magneto&Plug Fastening Holes
1.11. Cap Tightening Bolt Holes
1.12. Hose Holes for Gas Entrance/Exit
1.13. Plug Tightening Strip Bearing
1.14. Raincoat Bearing
2. Cap
2.1. Drawer
2.1.1. Feeder
2.2. Cap Connection Part
2.3. Safety Slide Bearing
2.4. Safety Slide Supportive Feeders
2.5. Safety Slide Screw Holes
2.6. Marking Section
2.7. Trigger Pin Bearing
2.8. Raincoat Stopper
2.9. Spring and Marble Bearing
3. Safety Slide
3.1. Slide Plate
3.2. Marble
3.3. Arc
4. Chassis Connection Part
5. Raincoat

DETAILED DESCRIPTION OF THE INVENTION

Invention comprises a body (1), a cap (2), a safety slide (3), a chassis connection part (4) and a raincoat (5). The body (1) comprises a bush (1.1), a bush bearing (1.2), a trigger pin (1.3), an automatic bearing (1.4), a gas cutting pin (1.5), a multiple of hammer lever bearings (1.6), a blower bowl bearing (1.7), a door drawer bearing (1.8), a body connection part (1.9), a multiple of magneto&plug fastening holes (1.10), a multiple of cap tightening bolt holes (1.11), a multiple of hose holes for gas entrance/exit (1.12), a plug tightening strip bearing (1.13) and a raincoat bearing (1.14). The cap (2) comprises a drawer (2.1), a cap connection part (2.2), a safety slide bearing (2.3), a multiple of safety slide supportive feeders (2.4), a multiple of safety slide screw holes (2.5), a marking section (2.6), a trigger pin bearing (2.7), a raincoat stopper (2.8) and a spring and marble bearing (2.9). The drawer (2.1) comprises a multiple of feeders (2.1.1) on the bottom side to increase the endurance. The safety slide (3) is mounted to the safety slide bearing (2.3) with the help of the slide plate (3.1) after the arcs (3.3) and the marbles (3.2) are placed to the spring and marble bearing (2.9) on the door (2). The arcs (3.3) and the marbles (3.2) prevent the safety slide (3) from changing its place easily and they work as a lock for the safety slide (3) to make it stay in its position.

The body (1), the cap (2), the safety slide (3), the chassis connection part (4) and the raincoat (5) parts are made from composite plastic material with sensitive production method by being pressed in plastic injection machine. The bush (1.1), the trigger pin (1.3), the automatic bearing (1.4) and the hammer lever bearings (1.6) are placed in plastic injection mold during the production of the body (1). Thus the body (1) is produced in one-piece with these parts in one single step. No extra processes are needed to center and to mount those parts.

All the parts that form the chassis, which is subject to invention, are produced by having the same properties with all their features because of their production in plastic injection mold from composite plastic material. Thus makes the outcome products have the same standards and lowers the time and the costs that would spend during the mounting process.

Montage of the system is provided by pulling the repellent pin inside of the body (1) by the supportive apparatus through the bush (1.1) group which comprises hammer lever, blower arc, pin, repellent pin, blower and blower bowl. Hammer lever is placed on the hammer lever bearings (1.6) and it works on that bearings. Mounting continues with the placement of automatic part to the automatic bearing (1.4). Magneto&plug and magneto sheet is screwed to the magneto&plug fastening holes (1.10). The plug tightening strip bearing (1.13) provides an easily mounting by preventing the strip from rotating during the mounting. The trigger is attached to the trigger pin (1.3) before the cap (2) is closed. Blower bowl is placed on the blower bowl bearing (1.7). Thus makes the pressure absorbed during the operation by being spread all over the surface. The body also comprises the hose holes for gas entrance/exit (1.12) to mount the hoses on it which provide gas entrance and exit.

First, the safety slide (3) is attached to the safety slide bearing (2.3) that is placed on the door (2). Then the arcs (3.3) and the marbles (3.2) are placed on the spring and marble bearing. Finally the slide plate (3.1) is mounted to the door by screwing through the safety slide screw holes (2.5). Thus makes the mounting of the safety slide (3) completed. The door comprises the safety slide supportive feeders (2.4) to make easy the opening and closing operation during the usage of the safety slide (3). While closing the cap (2) on the body (1) and the safety slide (3) is opened, the drawer (2.1) is placed on the door drawer bearing (1.8) and the trigger pin (1.3) is placed on the trigger pin bearing (2.7). The drawer (2.1) and the door drawer bearing (1.8) are formed the durable blower bowl bearing (1.7) by combining to each other. The cap and the body are combined by the bolts through the cap tightening bolt holes (1.11). The repellent pin, which is pulled through the bush (1.1) by supportive apparatus, is released to place the group on the blower bowl bearing (1.7). Raincoat (5) is mounted by being attached to the raincoat bearing (1.14) and being pushed down to the raincoat stopper (2.8) on the cap. The attachment of the chassis on the bird repellent device is completed by placing the body connection part (1.9) and the cap connection part (2.2) correspondent to the leg of the bird repellent device. The body connection part (1.9) and the chassis connection part (4) are placed where the leg of the repellent device is stayed between them. Then the chassis connection part (4) is mounted on the body connection part (1.9) by screwing. The cap comprises the marking section (2.6) on it which identifies the producer.

The hammer part of the hammer lever stays out of the body so it cannot be covered by the body (1) and the cap (2). The raincoat (5) is used to protect that part from external factors. Raincoat (5) is mounted by being attached to the raincoat bearing (1.14) on the body (1) and being fixed by being pushed down to the raincoat stopper (2.8).

The mechanism chassis produced and mounted as described above has a structure which forms a bearing for all the parts, provides an operating without any problem for a long time and prevents interventions and being affected from external factors. The problems of the prior art are solved by placing (1) the body in plastic injection mold during the production process with the parts, which directly effects operation and montage of the mechanism, the bush (1.1), the trigger pin (1.3), the automatic bearing (1.4) and the hammer lever bearings (1.6) and make them come out as a one-piece product.

What is claimed is:

1. A mechanism chassis for mechanical wild bird and animal repellent devices, comprising:

a body, wherein the body comprises a bush formed to a top side of the body, a bush bearing connected to the bush, a trigger pin formed to a front side of the body, an automatic bearing penetrating the front side and a rear side of the body, a gas cutting pin formed on the front side of the body, a plurality of hammer lever bearings formed on an inner surface of the top side of the body, a blower bowl bearing formed on a bottom side of the body, a door drawer bearing formed on the blower bowl bearing, a body connection part formed on the rear side of the body, a plurality of magneto and plug fastening holes formed on the top side and a left side of the body, a plurality of cap tightening bolt holes formed on the front side of the body, a plurality of hose holes formed on a right side of the body for gas entrance/exit, a plug tightening strip bearing formed on the left side of the body and a raincoat bearing formed on the rear side of the body, a cap connected to the body, a chassis connection part wherein the chassis connection part is mounted on the body connection part, and a raincoat, wherein the raincoat is attached to the raincoat bearing, wherein the body, the cap, the chassis connection part and the raincoat are made from a composite plastic material; and wherein the body is produced in one-piece.

2. The mechanism chassis for mechanical wild bird and animal repellent device of claim 1, wherein the cap comprises; a drawer placed on the door drawer bearing, a cap connection part formed on a rear side of the cap, a safety slide bearing formed on the rear side of the cap, a plurality of safety slide supportive feeders formed on the rear side of the cap, a plurality of safety slide screw holes formed on the rear side of the cap, a marking section formed on the rear side of the cap, a trigger pin bearing formed on a front side of the cap, and a raincoat stopper formed on the rear side of the cap.

3. The mechanism chassis for mechanical wild bird and animal repellent device of claim 2, wherein the drawer comprises; a plurality of feeders formed on a bottom side of the drawer which provide endurance.

4. The mechanism chassis for mechanical wild bird and animal repellent device of claim 2, wherein the raincoat stopper prevents the raincoat from sliding down.

5. The mechanism chassis for mechanical wild bird and animal repellent device of claim 1, wherein a blower bowl is placed on the blower bowl bearing and transfers an occurred pressure by spreading the occurred pressure equally to a surface during the operation.

6. The mechanism chassis for mechanical wild bird and animal repellent device of claim 1, wherein the raincoat bearing forms a bearing to the raincoat.

\* \* \* \* \*